United States Patent
Neumann

(10) Patent No.: US 11,727,344 B2
(45) Date of Patent: Aug. 15, 2023

(54) METHOD AND SYSTEM FOR IDENTIFYING AND GROUPING ALIMENTARY ELEMENTS FOR PHYSICAL TRANSFER

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 0 days.

(21) Appl. No.: 16/983,084

(22) Filed: Aug. 3, 2020

(65) Prior Publication Data

US 2022/0036309 A1    Feb. 3, 2022

(51) Int. Cl.
| | |
|---|---|
| *G06Q 10/08* | (2023.01) |
| *G06Q 10/04* | (2023.01) |
| *G06Q 10/0835* | (2023.01) |
| *G06K 19/06* | (2006.01) |
| *G06Q 10/0832* | (2023.01) |
| *G06Q 10/047* | (2023.01) |

(52) U.S. Cl.
CPC .    *G06Q 10/08355* (2013.01); *G06K 19/06028* (2013.01); *G06Q 10/047* (2013.01); *G06Q 10/0832* (2013.01)

(58) Field of Classification Search
CPC ............. G06Q 10/087; G06Q 10/0875; G06Q 10/08355; G06Q 10/0832; G06Q 10/083; G06Q 10/047; G06Q 10/08
See application file for complete search history.

(56) References Cited

U.S. PATENT DOCUMENTS

| | | |
|---|---|---|
| 8,200,548 B2 | 6/2012 | Wiedl |
| 10,026,055 B2 | 7/2018 | Riel-Dalpe et al. |
| (Continued) | | |

OTHER PUBLICATIONS

Agrawal, Apoorva. "Loss Functions and Optimization Algorithms. Demystified." Sep. 29, 2017, retrieved from https://medium.com/data-science-group-iitr/loss-functions-and-optimization-algorithms-demystified-bb92daff331c (Year: 2017).*

(Continued)

*Primary Examiner* — Resha Desai
*Assistant Examiner* — Michelle E Carey
(74) *Attorney, Agent, or Firm* — Caldwell Intellectual Property Law

(57) ABSTRACT

A system for identifying and grouping alimentary elements for physical transfer, the system comprising a computing device and an identification device, wherein the computing device is configured to receive a plurality of orders. Computing device may generate an identifier for each order, wherein an identifier is a machine-readable label that can be recognized using an identification device. Device may scan the machine-readable label using an identification device, wherein the identification device identifies the identifier from the machine-readable label and places an order into an active queue. Computing device may combine, using the orders in an active queue, orders that are to be transferred together, wherein combining further comprises determining which orders should be combined based upon an optimal path of transfer, and provide, to a user device, grouping instructions corresponding to which orders should be grouped.

12 Claims, 6 Drawing Sheets

(56) References Cited

U.S. PATENT DOCUMENTS

| | | | |
|---|---|---|---|
| 10,198,707 B1* | 2/2019 | Bolton | G06Q 10/08355 |
| 2002/0004749 A1 | 1/2002 | Froseth et al. | |
| 2004/0210621 A1 | 10/2004 | Antonellis | |
| 2005/0139663 A1* | 6/2005 | Hopwood | G06Q 20/208 |
| | | | 235/385 |
| 2010/0280895 A1 | 11/2010 | Mottola | |
| 2011/0071955 A1* | 3/2011 | Nakamura | G06Q 10/08355 |
| | | | 705/338 |
| 2011/0258134 A1* | 10/2011 | Mendez | G06Q 50/12 |
| | | | 705/332 |
| 2014/0058794 A1 | 2/2014 | Malov et al. | |
| 2015/0227888 A1 | 8/2015 | Levanon et al. | |
| 2016/0372005 A1 | 12/2016 | Bajpai et al. | |
| 2017/0024789 A1 | 1/2017 | Frehn et al. | |
| 2017/0372197 A1 | 12/2017 | Baughman et al. | |
| 2018/0157873 A1* | 6/2018 | Roth | G06Q 10/087 |
| 2018/0293638 A1 | 10/2018 | Simpson | |
| 2018/0308066 A1 | 10/2018 | Hadatsuki | |
| 2019/0043143 A1 | 2/2019 | Camacho et al. | |
| 2019/0228375 A1* | 7/2019 | Laury | G01C 21/343 |
| 2019/0266567 A1* | 8/2019 | Borucki | G06Q 10/08355 |
| 2020/0065892 A1 | 2/2020 | Brown | |
| 2020/0160263 A1* | 5/2020 | Kuettner | G06Q 10/0832 |

OTHER PUBLICATIONS

Irene Cruz Expósito, "Foodtech: robots, meal delivery services and healthy food," Banco Bilbao Vizcaya Argentaria, Nov. 2, 2018, https://www.bbva.com/en/foodtech-robots-meal-delivery-services-healthy-food/ (Year: 2018).*
https://www.sciencedirect.com/science/article/pii/S0959652620306740.
https://www.semanticscholar.org/paper/The-Meal-Delivery-Routing-Problem-Reyes-Erera/1c0b0f117437f4123cdeb77c24210610733de706.

* cited by examiner

METHOD AND SYSTEM FOR IDENTIFYING AND GROUPING ALIMENTARY ELEMENTS FOR PHYSICAL TRANSFER

FIELD OF THE INVENTION

The present invention generally relates to the field of machine-learning. In particular, the present invention is directed to identifying and grouping alimentary elements for physical transfer.

BACKGROUND

Efficient physical transfer of alimentary elements using vehicle route guidance is an increasingly vital process for provisioning of alimentary combination identifiers. However, existing methods for physical transfer using vehicle route guidance suffer from inaccuracy in predictions used to support further computations. Additionally, most strategies neglect the use of determining optimal transfer and quickly shunting alimentary elements through the appropriate pipeline.

SUMMARY OF THE DISCLOSURE

In an aspect, a system for identifying and grouping alimentary elements for physical transfer, the system comprising a computing device containing an identification device, wherein the computing device is configured to receive a plurality of orders. Computing device may generate an identifier for each order, wherein an identifier is a machine-readable label that can be recognized using an identification device. Device may scan the machine-readable label using an identification device, wherein the identification device identifies the identifier from the machine-readable label and moves an order into an active queue. Computing device may combine, using the orders in an active queue, orders that are to be transferred together, wherein combining further comprises determining which orders should be combined based upon an ideal path of transfer, and provide, to a user device, grouping instructions corresponding to which orders should be grouped.

In another aspect, a method for identifying and grouping alimentary elements for physical transfer, the system comprising a computing device containing an identification device, wherein the computing device is configured to receive a plurality of orders. Computing device may generate an identifier for each order, wherein an identifier is a machine-readable label that can be recognized using an identification device. Device may scan the machine-readable label using an identification device, wherein the identification device identifies the identifier from the machine-readable label and moves an order into an active queue. Computing device may combine, using the orders in an active queue, orders that are to be transferred together, wherein combining further comprises determining which orders should be combined based upon an ideal path of transfer, and provide, to a user device, grouping instructions corresponding to which orders should be grouped.

These and other aspects and features of non-limiting embodiments of the present invention will become apparent to those skilled in the art upon examination of the following description of specific non-limiting embodiments of the invention in conjunction with the drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings may not be to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for identifying and grouping alimentary elements for physical transfer. In an embodiment, a computing device may accept a plurality of orders, wherein orders contain alimentary elements, order times, and destinations. Computing device may generate a machine-readable label for each alimentary element of the plurality of alimentary elements wherein the label contains identifiable information regarding the order to which the alimentary element belongs. Members may receive the plurality of alimentary elements corresponding to orders and destination. An identification device contained by the computing device may be used to scan the machine-readable label and relate the alimentary elements to a computing device to generate an active queue. Computing device may use a linear optimization process to combine the orders in the active queue, wherein combining corresponds to calculating optimal path for the orders that are to be transferred together in the queue. The computing device may then log the optimal path and the orders that are to be combined into a single path, along a branched path, and transmit the data to a user device corresponding to which orders are to be taken, and along which path the orders may be transferred.

Figure 1:
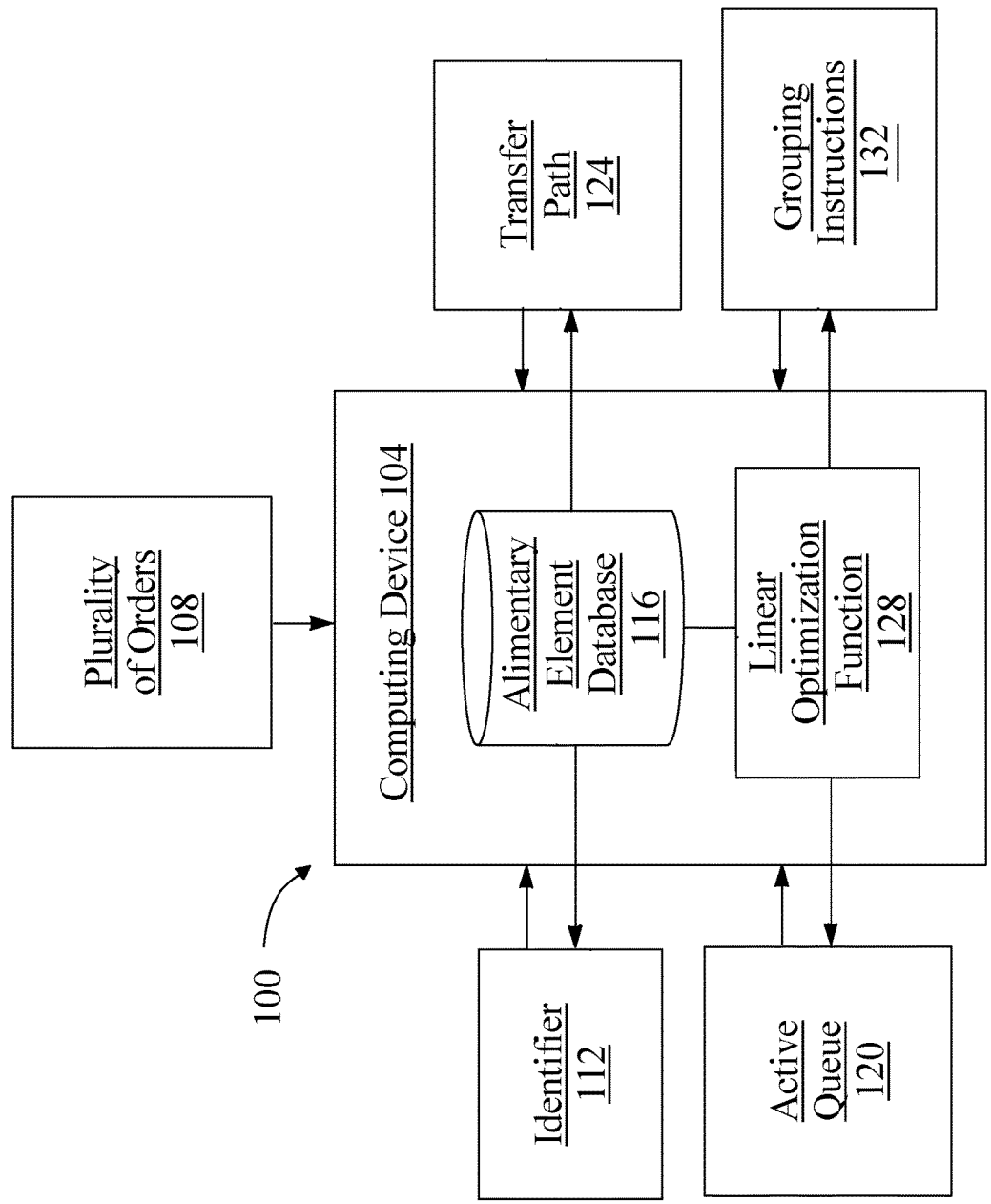
FIG. 1 is a block diagram of an exemplary embodiment of a system for identifying and grouping alimentary elements for physical transfer.

Referring now to FIG. 1, an exemplary embodiment of a system 100 for identifying and grouping alimentary elements for physical transfer is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or phone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet) a local area network (e.g., a network associated with a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. computing device 104 may include one or more computing devices specific to data storage, security, distribution of traffic for load balancing, and the like. Computing device 104 may distribute one or more computing functions as described below across a plurality of computing devices of computing device, which may operate in parallel, in series, redundantly, or in any other manner used for distribution of functions or memory between computing devices. Computing device 104 may be implemented using a "shared nothing" architecture in which data is cached at a single node, in an embodiment, this may allow scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded output is achieved; repetition of a step or a sequence of steps may be performed using outputs of previous repetitions as inputs to subsequent repetitions, grouping inputs and/or outputs of repetitions to produce an aggregate result, reduction or decrement of one or more variables such as global variables, and/or division of a larger processing task into a set of smaller processing functions. Computing device 104 may perform any step or sequence of steps as described in this disclosure in parallel, such as simultaneously and/or substantially simultaneously performing a step two or more times using two or more parallel threads, processor centers, or the like; division of functions between parallel threads and/or processes may be performed according to any protocol suitable for division of functions between iterations. Persons skilled in the art, upon examination of this disclosure, will be aware of various ways in which steps, sequences of steps, processing functions, and/or data may be divided, shared, or otherwise dealt with using iteration, and/or parallel processing.

Continuing in reference to FIG. 1, computing device 104 may receive a plurality of orders 108. The plurality of orders 108 may correspond to a plurality of alimentary elements of the plurality of orders 108 and the destination geolocation of the plurality of orders 108. The plurality of alimentary elements such as food, alimentary elements, groceries, and the like. The plurality of alimentary elements may be matched to an order, with a single order containing one or more alimentary elements. An order, of a plurality of orders 108, may have a plurality of destinations associated. The plurality of destinations may have geolocation data associated with the order information, wherein a destination geolocation may be an address, global positioning system (GPS) coordinates, or the like, that may be identified as a geolocation. Regardless of mode of physical transfer, at least a mode of physical transfer as used herein, may be guided by geolocation data to physically transfer an alimentary element to a geolocation destination. The system may use at least a plurality of physical transfer apparatuses and a plurality of orders, each with an associated element of data that refers to a geolocation destination.

Continuing in reference to FIG. 1, computing device 104 may generate an identifier 112 for each order, wherein an identifier 112 is a machine-readable label that can be recognized using an identification device. Generating an identifier may further include generating a code, ID, or the like, and applying a machine-readable label that corresponds to the identifier to each alimentary element of an order, wherein scanning the machine-readable label computationally concatenates the information in the identifier. A "machine-readable label," as used in this disclosure refers to a label, code, or the like, which may be a code, a barcode, a quick response (QR) code, matrix barcode, uniform resource locator (URL), or any other type of machine-readable label and/or identifier that may be applied to, printed on, or otherwise used to identify alimentary elements using a compatible device. A "compatible device," as used before, may refer to any device suitable to scanning, reading, or otherwise identifying a machine-readable label associated with an alimentary element, for instance and without limitation as a cell phone, radio frequency identification (RFID) device, or other suitable device. As used in this disclosure, "computationally concatenating" the information in the identifiers refers to joining the information from a first alimentary element with a second alimentary element. In non-limiting illustrative examples, if an order contained two alimentary elements, an identifier of the first alimentary element may contain information that the second alimentary exists, its identity as an alimentary element, and its order time, recipient name, cost, destination, and the like. In such an example, if the identifier for each alimentary element has been acknowledged by the identification device, information regarding a "complete order" can be provided to the computing device.

Generating an identifier may include applying a label to each alimentary element of an order, wherein generating an identifier may include creating a physical label to place on element alimentary element. Applying a label may include applying a machine-readable label wherein recognizing the label with a compatible device may receive, retrieve, or otherwise transmit destination and/or physical transfer path information associated with the alimentary element. A compatible device for locating the identifier and transmitting the information corresponding to the identifier may be an identification device contained in the computing device 104 and/or a remote device.

Continuing in reference to FIG. 1, computing device 104 may receive the plurality of orders containing the machine-readable label identifying a plurality of alimentary elements contained within each order. A machine-readable label, as described above may be affixed, printed onto, and/or otherwise attached to each element of the plurality of alimentary elements. Each alimentary element may have a label that is identical to other elements within the same order. Alternatively or additionally each alimentary element may have unique labels, regardless of if it belongs to a singular order.

Figure 2:
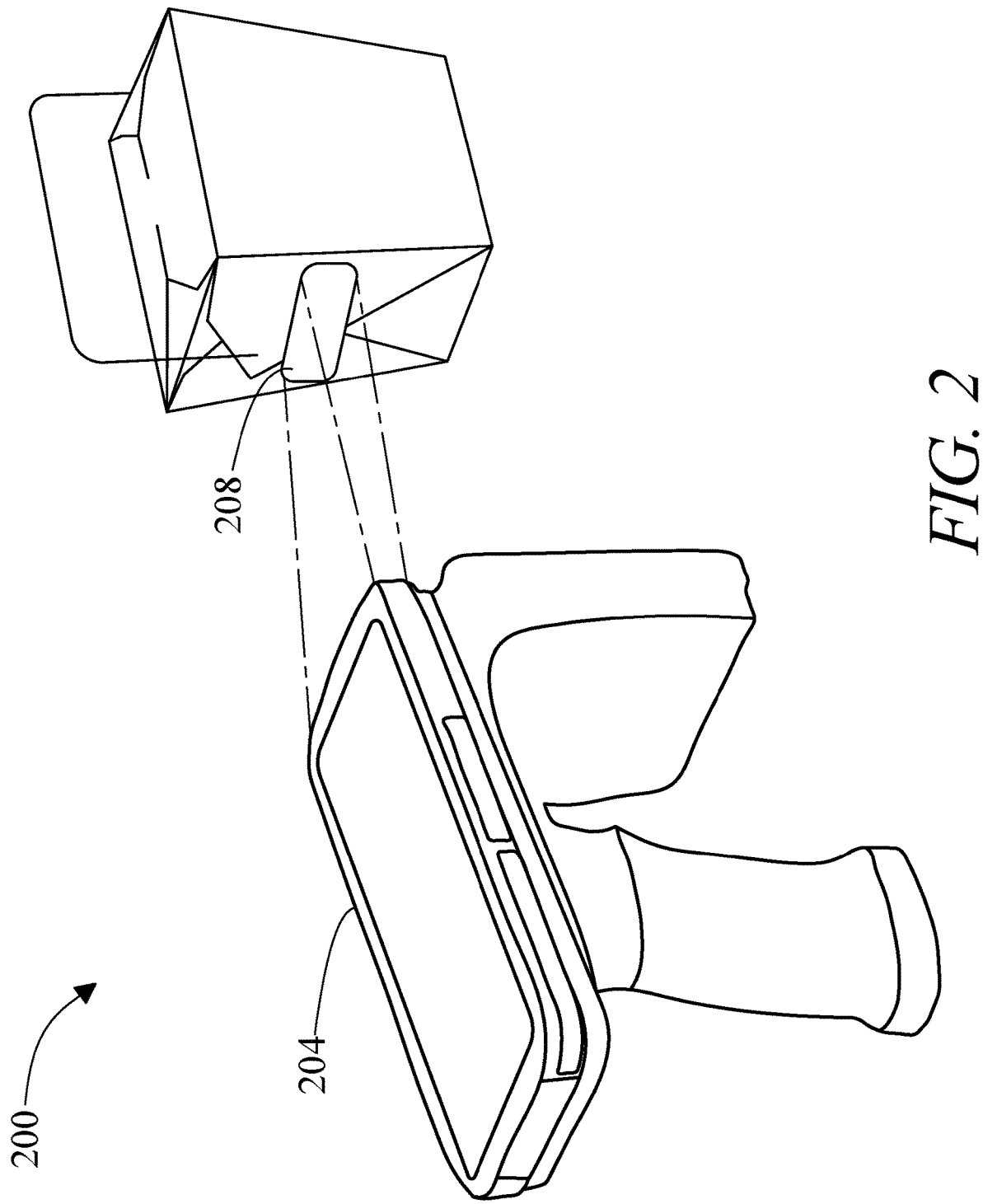
FIG. 2 is a diagrammatic representation of an exemplary embodiment of an identification device scanning a machine-readable label.

Continuing in reference to FIG. 2, a non-limiting exemplary embodiment 200 of an identification device 204 which may scan the machine-readable label 208, wherein the identification device 204 may extract the identifier 112 from the machine-readable label 208 and place an order into an active queue, is illustrated. Extracting using the identification device 204 may include using the identification device 204 to scan, read, or otherwise extract using the machine-readable label 208 on the alimentary element, the identifier 112. An "active queue," as used in this disclosure refers to linear data structure of a sequential collection of objects, wherein the individual data entries and/or objects relate to the alimentary elements that have been identified by information extracted from a machine-readable label 208 by the identification device 204. The active queue may contain a variety of elements of data, for instance and without limitation, the identify of alimentary elements, the destination, and/or the order information corresponding to the alimentary element. The active queue may provide information regarding whether all alimentary elements of an order have been entered into the queue and/or which alimentary elements have not.

Referring now to FIG. 1, computing device 104 may scan the machine-readable label using the identification device 204, wherein the identification device 204 records the identifier information for each of the plurality of alimentary elements and constructs an active queue 120 for each of the scanned orders. Computing device 104 may retrieve information from an alimentary element database 116, corresponding to which order each alimentary element corresponds to and the associated destination for each order, as described in further detail below. Recording using the identification device 204 may include determining if all alimentary elements of an order are accounted for by retrieving information from the alimentary element database 116 regarding which alimentary element identifiers must be present in the active queue 102 to complete the order. For instance in non-limiting illustrative examples, each alimentary element may have a unique identifier 112 associated therewith, and when all identifiers associated with an order have been scanned into an active queue 120, information corresponding the order can be retrieved and may be communicated that the order is sufficiently completed. Scanning the plurality of alimentary elements using the identification device 204 may record the identifier 112 information to determine if all alimentary elements of an order are accounted for, for instance and without limitation, if alimentary elements that should have been completed alongside others have not been scanned a notification may appear that an alimentary element may be missing. In non-limiting illustrative examples, this may include providing information that determines if the order is 'complete', wherein completeness may refer to whether all alimentary elements were identified and/or if any are missing.

Figure 3:
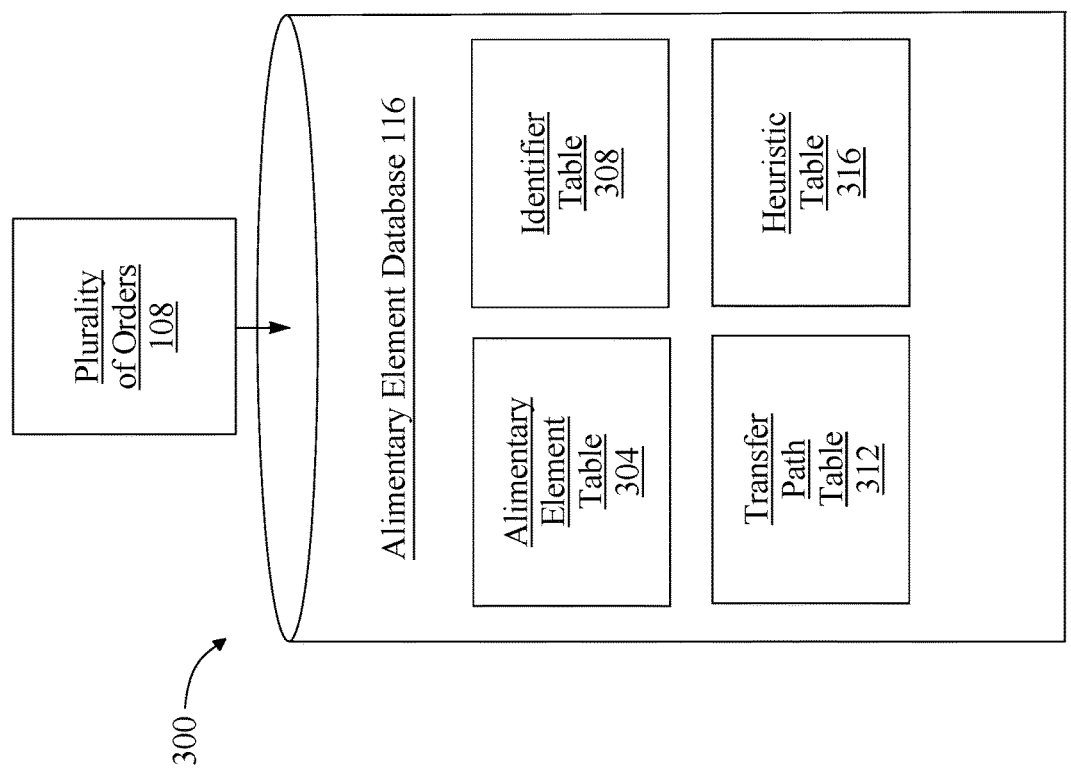
FIG. 3 is a block diagram illustrating an exemplary embodiment of an alimentary element database.

Referring now to FIG. 3, a non-limiting exemplary embodiment 300 of an alimentary element database 116 is illustrated. a non-limiting exemplary embodiment of an alimentary element database 116 is illustrated. Alimentary element database 116 may be implemented, without limitation, as a relational database, a key-value retrieval database such as a NOSQL database, or any other format or structure for use as a database that a person skilled in the art would recognize as suitable upon examination of this disclosure. Alimentary element database 116 may alternatively or additionally be implemented using a distributed data storage protocol and/or data structure, such as a distributed hash table and the like. Alimentary element database 116 may include a plurality of data entries and/or records, as described above. Data entries in a alimentary element database 116 may be flagged with or linked to one or more additional elements of information, which may be reflected in data entry cells and/or in linked tables such as tables related by one or more indices in a relational database. Persons skilled in the art, upon inquiry of the entirety of this disclosure, will be aware of various ways in which data entries in a database may store, retrieve, organize, and/or reflect data and/or records as used herein, as well as categories and/or populations of data consistently with this disclosure.

Further referring to FIG. 3, alimentary element database 116 may include, without limitation, an alimentary element table 304, identifier table 308, transfer path table 312, and heuristic table 316. Determinations by a machine-learning process, machine-learning model, identification device, mapping algorithm, and/or linear optimization function may also be stored and/or retrieved from the alimentary element database 116, for instance in non-limiting examples an identifier 112 describing an alimentary element as it relates to an order and a destination. Determinations by a linear optimization function for optimizing a transfer path for transferring alimentary elements to a plurality of destinations may also be stored and/or retrieved from the alimentary element database 116. As a non-limiting example, alimentary element database 116 may organize data according to one or more instruction tables. One or more alimentary element database 116 tables may be linked to one another by, for instance in a non-limiting example, common column values. For instance, a common column between two tables of alimentary element database 116 may include an identifier of a submission, such as a form entry, textual submission, global position system (GPS) coordinates, addresses, numerical values, and the like, for instance as defined below; as a result, a query may be able to retrieve all rows from any table pertaining to a given submission or set thereof. Other columns may include any other category usable for categorization or subdivision of data, including types of data, names and/or identifiers of individuals submitting the data, times of submission, and the like; persons skilled in the art, upon inquiry of the entirety of this disclosure, will be aware of various ways in which data from one or more tables may be linked and/or related to data in one or more other tables.

Still referring to FIG. 3, in a non-limiting embodiment, one or more tables of a alimentary element database 116 may include, as a non-limiting example, an alimentary element table 304, which may include destinations, identifiers 112, addresses, order information, or the like, including when the order was placed, the identity of the alimentary elements in said order, and/or linked to other data such as the order destination data for an alimentary element, for use in determining physical transfer combinations, and/or other elements of data computing device 104 and/or system 100 may store, retrieve, and use to determine usefulness and/or relevance of data in determining an active queue, transfer paths, and the like, as described in this disclosure. One or more tables may include identifier table 308, which may include a history of numerical values, alphanumerical codes, barcodes, QR codes, RFID barcodes, timestamps, and the like, for instance and without limitation, that represent alimentary elements associated with an order and destination for physical transfer apparatuses. One or more tables may include transfer path table 312, which may include a history of numerical values, GPS coordinates, addresses, timestamps, and the like, for instance and without limitation, that represent transfer paths determined for physical transfer apparatuses in determining travel time. One or more tables may include, without limitation, a heuristic table 316, which may include one or more inputs describing potential mathematical relationships between at least an element of user data, and may organize rankings, scores, models, outcomes, functions, numerical values, vectors, matrices, and other determinations and, for instance and without limitation, physical transfer path for a plurality of alimentary elements, and rankings thereof, and/or which alimentary elements should be taken as part of the active queue and how they may change as a function of reaching particular areas of a map.

Referring now to FIG. 1, computing device 104 may determine, as a function of the orders in an active queue 120, a first order and a second order that are to be transferred together, wherein determining may include calculating, using a linear optimization function of the destination locations corresponding to the orders that have been scanned into the active queue 120, an optimal transfer path for each combination of orders in the active queue 120. A "transfer path," as used in this disclosure refers to a path along which a plurality of orders may get to their corresponding destination by a physical transfer apparatus. A "physical transfer apparatus," may refer to any physical apparatus that can transfer an alimentary element along positions on a map. For instance and without limitation, a physical transfer apparatus may be a vehicle, bicycle, or a drone. A transfer path 124 may depend upon the type of physical transfer apparatus, order time, and the order destination.

With continued reference to FIG. 1, computing device 104 generates a plurality of predicted routes as a function of estimated assembly times. A "predicted route," as described in this disclosure, is a route that a courier may follow from one or more alimentary providers to one or more users, to deliver alimentary combinations. Each predicted route of the plurality of predicted routes includes at least one retrieval from at least an alimentary provider and at least a destination, of plurality of destinations. Plurality of predicted routes may include at least one compound route. A "compound route," as used in this disclosure, is a route to more than one destination and/or from more than one alimentary provider. For instance, a party of users may order a plurality of meals from different providers, which may be delivered together using a compound route. As a further example, a plurality of orders to different destinations may be grouped together based on shared potential courier travel paths.

With continued reference to FIG. 1, generating plurality of predicted routes may include receiving delivery parameters corresponding one or more orders. Delivery parameters may include various factors or measurements that may affect the length of time between one or more tracked events, such as courier timeline events as described above. In various embodiments, delivery parameters may include time, date, traffic, weather, historical courier performance, and size of markets. Delivery parameters may further include the number of orders received, the number of items in an order, the type of dishes in an order, the sub-total of an order, the historical restaurant data; various other parameters may be used. Traffic information may be tracked in real-time. In some embodiments, traffic information may be tracked by a third-party application. In some embodiments, traffic data is updated in real-time, or constantly updated in near real-time. Parameters corresponding to weather may also inform traffic or order impact. For example, inclement weather may correlate with heavier traffic due to hazardous conditions. Inclement weather may also correlate with more orders placed since users may be more likely to stay indoors. Weather parameters may also correspond to change in demands for particular food types. For example, more ice cream may be ordered during hot days. Another input parameter may include fleet load factor, which corresponds to the ratio of number of orders outstanding to the number of couriers outstanding. In some embodiments, the higher this ratio of fleet load factors may correspond to an insufficient number of couriers, and thus longer time durations for events after order ready. Historical performance of a courier may be a record of the previous time durations between one or more events on courier timeline for a particular courier. This record may be compared to the average time durations between one or more events on courier timeline for all couriers within a given area. The neural network may use this factor to assign a particular state variable to a given courier to adjust predictions accordingly. For example, a given courier may have shorter time durations between particular events, such as between parked at alimentary provider and arrival at alimentary provider, as compared to the average for a given area. In some embodiments, historical performance parameters may be organized into aggregate units for a predetermined amount of time. For example, the historical performance of a courier or alimentary provider for a previous thirty day increment may be given higher weighted values. In some embodiments, historical performance parameters for days occurring before a previous thirty days may also be input with lower weighted values. In some embodiments, historical performance parameters for days occurring before a previous thirty (30) days may be discarded. In some embodiments, a machine-learning model and/or neural network may determine an average rate for time durations between one or more events on a courier timeline for couriers in a given predetermined area.

With continued reference to FIG. 1, computing device 104 may generate a predictive event model to generate the plurality of predicted routes. Predictive event model may include, without limitation, a machine-learning model; machine-learning model may include any machine-learning model as described above, including without limitation a regression model and/or neural net. Training data used by computing device 104 and/or another device in system may include a plurality training entries, each training entry correlating extrinsic data and/or other data describing circumstances that may affect a courier's performance to overall delivery times and/or intervals between events on a delivery and/or courier timeline as described above. There may be a plurality of predictive event models, which may include neural net models and/or regression models, for different courier timeline events, different couriers, or the like. Neural network may include a plurality of subnetworks, each of which function as a predictive event model to generate an estimated length of time for a particular interval of time between subsequent delivery events. As used herein, terms "subnetwork" and "event model" may be used interchangeably, unless otherwise noted. In some embodiments, each interval between events, such as those described above corresponding to a courier timeline, may be associated with a subnetwork. In other words, a particular predictive event model may predict a duration between one event to a subsequent event.

With continued reference to FIG. 1, delivery parameters may be input into the corresponding predictive event model as weighted factors. In various embodiments, predictive event model may be trained to correlate various parameters with particular effects on time durations between successive events. For instance, a neural-net predictive event model may assign weights to parameters creating weighted factors. Such weights may be adjusted based on actual time of arrivals.

Continuing in reference to FIG. 1, computing device 104 may compute a score associated with each order combination of the plurality of orders and select a transfer path to minimize and/or maximize the score, depending on whether an optimal result is represented, respectively, by a minimal and/or maximal score; a mathematical function, described herein as an "linear optimization function," may be used by computing device 104 to score each possible pairing. Computing device 104 may pair a predicted path, with a given physical transfer apparatus, for a given order combination that optimizes the linear function. In various embodiments, a score of a particular transfer path 124 may be based on a combination of one or more factors, including orders. Each factor may be assigned a score based on predetermined variables. In some embodiments, the assigned scores may be weighted or unweighted. In a non-limiting example, an active queue may have four distinct orders, which may represent up to 4!, or up to 24 possible order rankings for transfer path combinations if all 4 were to be delivered along a single transfer path 124; alternatively or additionally, depending on the number of physical transfer apparatuses and their location, as described in further detail below, all 24 combinations may not need to be considered if the 4 orders can be separated into shorter transfer paths 124 among two or more physical transfer apparatuses.

Optimization of the linear function may include performing a greedy algorithm process. A "greedy algorithm" is defined as an algorithm that selects locally optimal choices, which may or may not generate a globally optimal solution. For instance, computing device 104 may select orders from the active queue 120 so that scores associated with transfer paths 124 therewith are the best score for each combination of orders and/or for each physical transfer apparatus, but may not represent transfer paths 124 for all orders within the queue. In such an example, optimization may determine the combination of orders along a transfer path 124 such that each physical apparatus pairing includes the highest score possible, representing a locally optimal result.

Still referring to FIG. 1, linear optimization function 128 may be formulated as a linear function, which computing device 104 may solve using a linear program such as without limitation a mixed-integer program. A "linear program," as used in this disclosure, is a program that optimizes a linear function, given at least a constraint. For instance and without limitation, the number of physical transfer apparatuses available. In various embodiments, system 100 may determine a combination of orders that maximizes a total score subject to a constraint that, for instance, a single physical transfer apparatus is available. A mathematical solver may be implemented to solve for the set of orders that maximizes scores; mathematical solver may implemented on computing device 104 and/or another device in system 100, and/or may be implemented on third-party solver.

With continued reference to FIG. 1, optimizing linear function may include minimizing a loss function, where a "loss function" is an expression of an output of which an algorithm minimizes to generate an optimal result. As a non-limiting example, computing device 104 may assign variables relating to a set of parameters, which may correspond to score components as described above, calculate an output of mathematical expression using the variables, and select a combination of orders that produces an output having the lowest size, according to a given definition of "size," of the set of outputs representing each of plurality of candidate ingredient combinations; size may, for instance, include absolute value, numerical size, or the like. Selection of different loss functions may result in identification of different potential pairings as generating minimal outputs. Persons skilled in the art, upon inquiry of this disclosure in its entirety, will be aware of the various ways in which linear functions may be implemented and optimized to find optimal outputs corresponding to which combination of orders may be transferred along which path, given the number of available physical transfer apparatuses, while minimizing time to destination from when an order was placed.

Still referring to FIG. 1, computing device 104 may solve linear optimization function 128 using a linear program such as without limitation a mixed-integer program. For instance, and without limitation, mixed-integer program may seek to maximize a total score $\Sigma_{r \in R} \Sigma_{s \in S} c_{rs} x_{rs}$, wherein R is the set of all orders r, S is a set of all physical transfer apparatuses s, $c_{rs}$ is a score of a pairing of a given order with a physical transfer apparatus, and $x_{rs}$ is 1 if an order r is paired with physical transfer apparatus s, and 0 otherwise. Continuing the example, constraints may specify that each order is assigned to only one physical transfer apparatus, and each physical transfer apparatus is assigned only one transfer path 124 at a time; paths may include compound transfer paths 124, wherein a transfer path 124 is branched, nested, and/or required more than one physical transfer apparatus with a switching off of alimentary elements. Sets of paths may be optimized for a maximum score combination of all generated transfer paths 124. In various embodiments, system 100 may determine combination of transfer paths 124 that maximizes a total score subject to a constraint that all orders are paired to exactly one physical transfer apparatus. Not all physical transfer apparatuses may receive a transfer path 124 pairing since each order may only be delivered by one physical transfer apparatus. A mathematical solver may be implemented to solve for the set of feasible pairings that maximizes the sum of scores across all pairings; mathematical solver may implemented on computing device 104 and/or another device in system 100, and/or may be implemented on third-party solver.

Continuing in reference to FIG. 1, computing device 104 may determine a first order and a second order that are to be transferred together which may include retrieving, from an alimentary element database 116, a transfer path 124 relating to the orders in an active queue 120, and determining optimal transfer path 124. Optimal transfer paths 124 may already be calculated and stored and/or retrieved from a database, for instance as described in U.S. Nonprovisional application Ser. No. 16/890,839, filed on Jun. 2, 2020, and entitled "METHODS AND SYSTEMS FOR PATH SELECTION USING VEHICLE ROUTE GUIDANCE," the entirety of which is incorporated herein by reference. As alimentary elements are scanned by an identification device 204 and placed in an active queue 120, the most optimal path may be retrieved as previously as calculated for the alimentary elements that are in the active queue 120. Alternatively or additionally, once all alimentary elements for a corresponding transfer path 124 have entered into the active queue 120, the optimal transfer path 124 may be retrieved from an alimentary element database 116 and provided to a physical transfer apparatus. In such an example, scanning the alimentary elements into the active queue may indicate which orders are necessary in the combination to retrieve a transfer path 124, and in the event not all orders come, a new transfer path 124 may be optimized from a previously stored path. As alimentary elements are included and/or excluded from an active queue 120 optimal transfer paths 124 may be retrieved from the alimentary element database 116 and further optimized as a function of the available physical transfer apparatuses and locally optimal paths of what is present in the queue.

Continuing in reference to FIG. 1, computing device 104 may calculate, using a linear function of the destination locations corresponding to the orders that have been scanned into the active queue 120 by determining an output of a path that links all destination locations for the orders while minimizing the average time required for traversing the path for all combinations of orders in the active queue 120. Orders may be combined and selected from the active queue 120 based upon the time required to complete a transfer path 124 for the orders. Combining orders by solving a linear optimization function 128 of the destination locations corresponding to the orders that have been scanned into the active queue 120, wherein solving may include determining an output of a path that links all destination locations for the orders while minimizing the time required for traversing the path. Computing device 104 may retrieve an optimal transfer path 124 for a series of orders as a "starting point" for an optimization function, as described above, and select for instance a locally optimal combination of orders along the optimal transfer path 124. In such an example, the remainder of the order may be branched into a second transfer path 124 with a second physical transfer apparatus, among other solutions.

Continuing in reference to FIG. 1, computing device 104 optimizing a linear function of the destination locations to determine a transfer path 124 may include minimizing the average time of physical transfer of the orders in an active queue below a maximal threshold. Minimizing the average time of physical transfer of the orders may include determining a solution for an linear optimization function, as described above, wherein the time for completing the transfer path 124 for each order within a plurality of orders averages to a minimum time value. In such a non-limiting illustrative example, each order of the plurality of orders reaches its corresponding destination may reach its destination quicker while eliminating disparities in transfer time wherein some orders arrive quicker than expected and other arrive much later. A "maximal threshold," may refer to a maximum time wherein no orders will be placed in a transfer path that results in getting to a destination after the maximal time. For instance and without limitation, if a maximal threshold may be placed at 1 hour post-order, wherein any solution for a transfer path 124 may involve minimizing the average transfer time for the plurality of orders without allowing a single order to reach a destination 1 hour or more after being expected at a destination. In non-limiting illustrative examples, this may result in a single order assigned to a transfer path 124, and/or branching of transfer path 124 wherein some orders follow a different transfer path to avoid reaching destination in more than 1 hour.

Continuing in reference to FIG. 1, computing device 104 may select a transfer path for the a first order and the at least a second order, wherein the transfer path is an optimal transfer path for at least a combination of orders in the active queue 120.

Continuing in reference to FIG. 1, computing device 104 may updated the transfer path as a function of an available physical transfer apparatus containing a location, wherein updating the path further comprises branching the transfer path 124 as a function of the available physical transfer apparatuses. Determining which alimentary elements should embark upon a transfer path 124 may include the number of available physical transfer apparatuses. In non-limiting illustrative examples, determining a transfer path 124 for alimentary elements in an active queue 120 may include determining how many physical transfer apparatuses there are and their proximity to the alimentary elements. In such an example, the availability of physical transfer apparatuses may be determined by calculating the time difference between the physical transfer apparatus position along the current transfer path 124, when the transfer path may be completed, and how long it would take the physical transfer apparatus to reach the alimentary element current location. Determining the transfer path 124 may include taking into consideration this information. The number of orders distributed along a transfer path 124, the number of transfer paths 124, branch points in the transfer path 124, among other parameters, may be dictated by the number of physical transfer apparatus and where these physical transfer apparatuses are located along their respective transfer paths 124. Persons skilled in the art, upon inquiry of this disclosure in its entirety, will be aware of the various ways in which physical transfer apparatus location, physical transfer distance from an order location, and time to get to an order may be calculated for purposes described above.

Continuing in reference to FIG. 1, computing device 104 may transmit, to a user device, grouping instructions 132 as a function of the optimal transfer path. Transmitting to the user device grouping instructions 132 may include displaying on the user device grouping instructions 132, wherein grouping instructions describe which orders should be grouped for physical transfer. As used in this disclosure, "grouping instructions" refer to information regarding the orders, and the associated alimentary element, that are selected to be taken by a physical transfer apparatus along a physical transfer path 124. In non-limiting illustrative examples, a member associated with a physical transfer apparatus may use a computing device 104 to scan a plurality of alimentary elements, wherein grouping instructions 132 may be provided to a user device with instructions regarding which orders should be taken. In further non-limiting illustrative examples, a transfer path may also be provided to the same user device corresponding to the transfer path 124 for the plurality of orders in the grouping instructions 132.

With continued reference to FIG. 1, computing device 104 computes a projected nutritionally guided order volume. A "nutritionally guided order volume," as used in this disclosure, is a number of orders received in a given period of time in that are generated pursuant to an alimentary instruction set, which may include one or more recommended nutritional quantities.

computing device 104 may compute projected nutritionally guided order volume using one or more scheduled nutritionally guided orders generated through computing device 104 and/or system 100 as described above; for instance, some number of users in a geographic region may have received alimentary instruction sets, for instance as described above, and/or may have scheduled one or more alimentary combinations to be prepared and/or consumed based on alimentary combinations, on a given date and/or at a given time.

With continued reference to FIG. 1, computing projected nutritionally guided order volume may include training a first machine-learning process using training data associating past nutritionally guided order volumes with a plurality of past extrinsic circumstances, receiving at least a current extrinsic circumstance, and computing the projected nutritionally guided order volume as a function of the at least a current extrinsic circumstance using the machine-learning process. An "extrinsic circumstance," as used herein, is any parameter that may be used to predict nutritionally guided order, including without limitation a calendar date, time of day, season, one or more scheduled and/or spontaneous events such as sporting events, concerts, protests, conventions, or the like, current and/or forecasted weather, current and/or forecasted traffic, a volume of nutritionally guided orders that have already been received, a volume of guidance-free orders, as defined below, that have already been received, and/or a projected guidance-free volume as described in further detail below.

With continued reference to FIG. 1, a "machine learning process," as used in this disclosure, is a process that automatedly uses a body of data known as "training data" and/or a "training set" to generate an algorithm that will be performed by a computing device 104 module to produce outputs given data provided as inputs; this is in contrast to a non-machine learning software program where the commands to be executed are determined in advance by a user and written in a programming language.

With continued reference to FIG. 1, "training data," as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure. As a non-limiting illustrative example, training data used for first machine-learning process may include a plurality of entries correlating extrinsic data, as described above, to past volumes of nutritionally guided orders; each element of past data may be archived and/or tracked on computing device 104 and/or other elements of system 100, with correlations according to timestamps of such recorded data. Computing device 104 may train first machine-learning process and/or use first machine-learning process using training data.

With continued reference to FIG. 1, computing device 104 may be designed and configured to perform first machine-learning process and/or create a machine-learning model therewith using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, computing device 104 may be designed and configured to perform first machine-learning process and/or create a machine-learning model therewith by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 1, computing projected nutritionally guided order volume may include computing a per-provider nutritionally guided order volume. As used herein, a "per-provider nutritionally guided order volume" is a prediction for a volume of nutritionally guided orders that will be received by a particular provider. For instance, and without limitation, a separate regression algorithm and/or neural net may be trained and/or utilized to compute a per-provider nutritionally guided order volume for each alimentary provider. Neural network may include a plurality of subnetworks, each of which function as a predictive event model to generate a nutritionally guided order volume for a particular alimentary provider. In an embodiment, per-provider nutritionally guided order volumes may be aggregated using averaging, addition, or the like, to produce an overall and/or aggregate nutritionally guided order volume over a geographical region, which may include any geographical region as described in further detail below.

With continued reference to FIG. 1, computing device 104 determines a plurality of assembly times. An "assembly time," as used in this disclosure, is an amount of time that it takes an alimentary provider to prepare an alimentary combination, such that the alimentary combination is ready for delivery. In an embodiment, a plurality of assembly times includes an assembly time for each alimentary combination of plurality of alimentary combinations. An "alimentary combination," is defined for the purposes of this disclosure as a combination of ingredients that an alimentary provider and/or alimentary provider device indicates may be provided, for instance and without limitation in the form of a meal. Computing device 104 determines each assembly time of plurality of assembly times as a function of the nutritionally guided order volume. Nutritionally guided order volume may affect assembly time in various ways; for instance, an alimentary provider may have particular persons ingredients, and/or pieces of equipment that can process only a limited number of orders at a time, such that a nutritionally guided order volume above a certain volume may cause increasing delays in assembly of alimentary combinations.

With continued reference to FIG. 1, computing device 104 may determine each assembly time of plurality of assembly times by performing a third machine-learning process. Third machine-learning process may be implemented using any machine-learning algorithm as described above, including without limitation performance of a regression algorithm, training a neural net, or the like. Computing device 104 may train third machine-learning process using training data correlating inputs including past nutritionally guided order volumes to outputs representing past assembly times, where past assembly times, training data, and/or one or more models produced may be specific to alimentary provider. For instance, and without limitation some alimentary providers may be more likely to have increased assembly times as a result of greater nutritionally guided order volumes than others owing to factors such as limited staffing, facility sizes, equipment, prepared ingredient supplies, and the like. Computing device 104 may input projected nutritionally guided order volume, which may be combined with one or more additional inputs, to third machine-learning process, and output an assembly time for each alimentary provider of plurality of alimentary providers.

With continued reference to FIG. 1, inputs to third machine-learning process may further include types of alimentary combinations. For example, certain dishes may be correlated with particular assembly times. Inputs may include order sizes; in some embodiments, more items within an order may correlate to longer assembly times. Inputs may include order prices. For instance, a sub-total price of an order may also correspond to order size or order preparation time and may be used as a proxy to order size; a larger sub-total may correlate to a larger number of items within the order. Additionally, more expensive items may take longer to make, due to more ingredients, more difficulty, or more specialization in preparation. Inputs may include one or more particular nutritional recommendations followed in preparing alimentary combinations; for instance, some nutritional recommendations may be more labor intensive, be more complex, or require ingredients that take longer to prepare such as ingredients that must be soaked, marinated, fermented, cooked slowly, or the like. Some processes for generating recommended meals may be more demand-sensitive, as they might require more skilled preparation or preparation by a limited number of persons and/or specialized equipment. Similarly, in some embodiments, a neural network and/or regression model used in third machine-learning process may determine an average rate for time durations between one or more events on an alimentary provider timeline for a particular alimentary provider, for instance as described above. However, historical performance may also be input as parameters. Historical performance of a particular alimentary provider may also be input. This may include an average time duration between events on alimentary provider timeline for that particular alimentary provider. Neural network and/or regression model may use this factor to assign a particular state variable to a given alimentary provider to adjust predictions accordingly. For example, an average time for a particular alimentary provider to prepare a particular item may be tracked and determined. As an example, some alimentary providers may not transmit a confirmation of receipt of order, but instead immediately begin preparation of the order. Once an order has been complete, alimentary provider may then transmit a confirmation of receipt of order and confirmation of completion of order simultaneously. A neural network and/or regression model may determine an estimated time of completion prediction accordingly such that a delivery routing system 128 may appropriately assign a courier at the optimal time.

With continued reference to FIG. 1, plurality of assembly times may be used to determine optimal retrieval times for couriers to being delivery routes; accurate predictions may prevent courier downtime while awaiting a meal that has not completed preparation, alimentary combination downtime that may occur when an alimentary combination is ready for delivery and no courier is present. Furthermore, accurate prediction of alimentary assembly times may enable greater accuracy in route prediction and/or assignment as described in further detail below.

With continued reference to FIG. 1, inputs may include one or more projected guidance-free order volumes. A "guidance-free order volume," as used in this disclosure, is a volume and/or number of orders that are not prepared according to an alimentary instruction set used within system 100. As a non-limiting example, an order making up part of guidance-free order volume may be an order by a person or a party of persons that decide to order a meal or a plurality of meals for a party, conference, special occasion, or the like, without regard to any kind of meal plan or instruction set as described above. Such guidance-free orders may be generated and/or received through a variety of services and platforms, some of which may be inside of system 100 while others be outside of system 100; thus guidance-free order volume may be measured and/or recorded less directly than nutritionally guided order volume.

With continued reference to FIG. 1, determining a plurality of assembly times may include computing a projected guidance-free order volume and determining the plurality of assembly times as a function of the projected nutritionally guided order volume and the projected guidance-free order volume. Computing guidance-free order volume may include training a second machine-learning process using training data associating past guidance-free order volumes with a plurality of past extrinsic circumstances, which may include any extrinsic circumstances as described above, receiving at least a current extrinsic circumstance, and computing projected guidance-free order volume as a function of the at least a current extrinsic circumstance using the machine-learning process. second machine-learning process may include any machine-learning process as described above, including without limitation a regression-based machine-learning process, a process implementing and/or training a neural net, or the like.

With continued reference to FIG. 1, training data may include a plurality of entries correlating past extrinsic data to guidance-free order volumes. As a non-limiting example, certain dates may fall on holidays that are historically known to be busy days. Thus, certain holidays may be correlated with increased number of orders placed in general. Additionally, certain times of the day may be associated with greater volumes of orders. In some embodiments, a size of markets may correspond to the number of individuals in a certain market who are potential users, couriers, and/or alimentary providers of a product or service. As used herein, the term market may be used to mean either a particular alimentary provider, or a group of alimentary providers associated with a particular product type. However, in some embodiments, the term market may refer to the total users, couriers, and/or alimentary providers in a given area that is part of the on-demand delivery service. second machine-learning process may identify particular market sizes as correlated with certain differences in times for order preparation. A size of markets may also correspond to new and more mature markets. For example, a newer market may be correlated with longer order preparation times in third machine-learning process, while more mature markets may be correlated with faster order preparation times. Computing device 104 may calculate a projected guidance-free order volume as a per-provider guidance-free order volume, which may project guidance-free order for each alimentary provider. In an embodiment, projected guidance-free order volume may be used to determine a likely current or near-future order volume in which a significant portion of orders originate from entities and/or devices outside of system 100. In some embodiments, entities not affiliated with system 100 or an operator thereof may not provide up-to-date order information to system 100; using machine learning to compute a projected guidance-free order volume using historical data, for instance as reported by and/or collected from alimentary providers, may enable system 100 to track overall demand, as well as demand driven by nutritionally guided orders in system 100, and thus more accurately determine assembly times, capacity of alimentary providers to fulfill needed orders, and/or a number of couriers needed within a given region.

Figure 4:
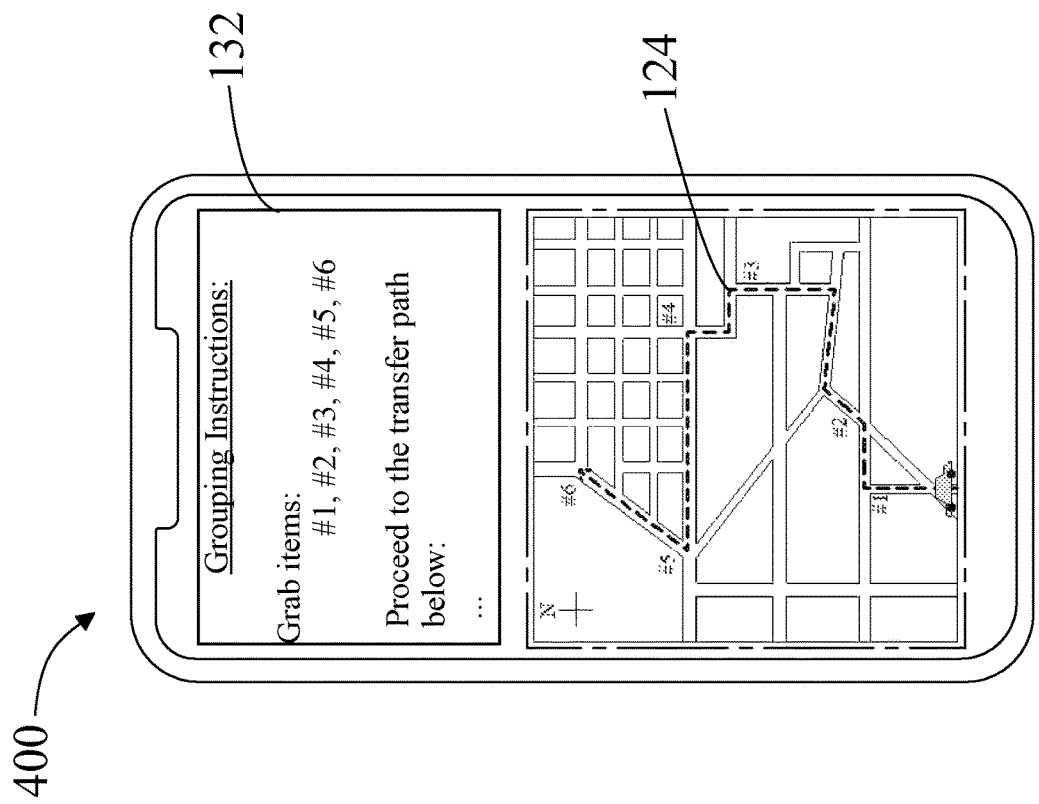
FIG. 4 is a diagrammatic representation of an exemplary embodiment of a user device.

Referring now to FIG. 4, a non-limiting exemplary embodiment of a computing device 104 providing, to a user, grouping instructions 132 displaying, to a user device 400, instructions corresponding to which orders should be grouped for physical transfer. A "user device," may refer to any device that may connect via a network with the system 100, computing device 104, and/or alimentary element database 116, as described in further detail below. User device 400 may display the grouping instructions 132 so that a physical transfer apparatus or any associated individuals may recognize which of the alimentary elements of the active queue should be taken. User device may also display a transfer path 124 associated with the orders in the grouping instructions 132. User device 400 may display grouping instructions 132 and/or transfer path 124 using a graphical user interface, mapping application, textual display, or any other suitable method of displaying transfer paths 124, textual instructions, graphics, or the like. Alternatively or additionally, grouping instruction may be provided via the identification device 204, for instance as augmented reality (AR), textual display, graphical user interface (GUI), or any other suitable method through the identification device 204 interface so that alimentary elements that are recognized through the capture and/or device can be shown on the screen with an indication that it is to be taken by a physical transfer apparatus. Persons skilled in the art, upon inquiry of this disclosure in its entirety, will be aware of the various ways in which grouping instructions and transfers paths may be displayed via a user device.

Figure 5:
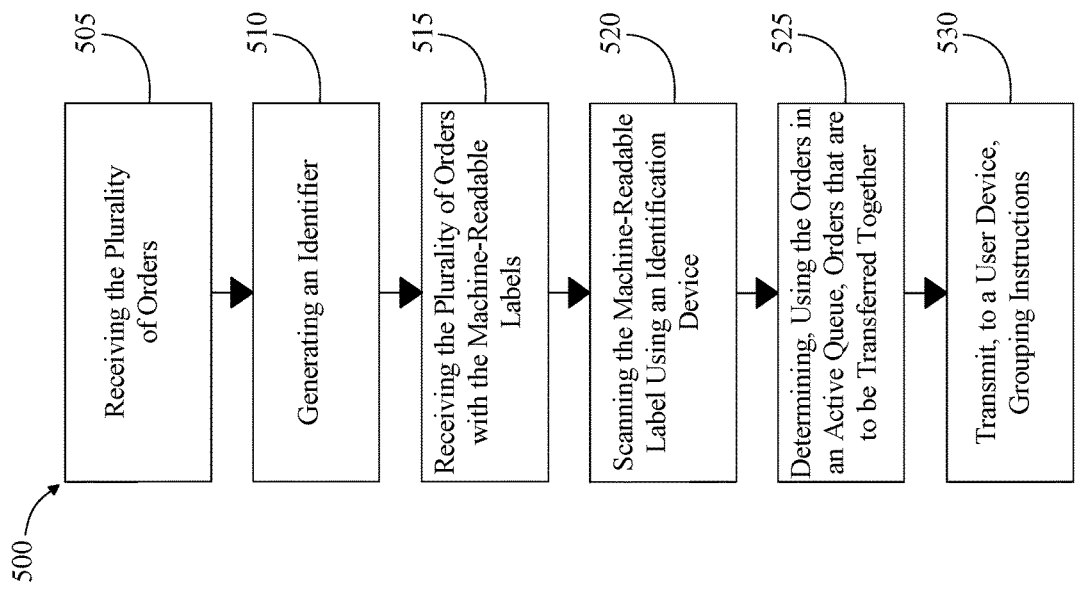
FIG. 5 is a flow diagram illustrating an exemplary method for identifying and grouping alimentary elements for physical transfer.

Referring now to FIG. 5, an exemplary embodiment of a method 500 for identifying and grouping alimentary elements for physical transfer is illustrated. At step 505, computing device 104 may receive a plurality of orders. The plurality of orders corresponds to a plurality of alimentary elements and a plurality of destinations; this may be implemented, without limitation, as described above in reference to FIGS. 1-4.

At step 510, computing device 104 may generate an identifier 112 for each of the plurality of orders, wherein an identifier 112 is a machine-readable label that contains destination information. Generating an identifier may include applying a machine-readable label to each alimentary element of an order wherein each alimentary element of the order contains an identifier that computationally concatenates the information of the other elements of the order; this may be implemented, without limitation, as described above in reference to FIGS. 1-4.

At step 515, computing device 104 may receive the plurality of orders with the machine-readable label on all elements of the plurality of alimentary elements; this may be implemented, without limitation, as described above in reference to FIGS. 1-4.

At step 520, identification device 204 may scan the machine-readable label using the identification device 204, wherein the identification device 204 records the identifier information for each of the plurality of alimentary elements and constructs an active queue 120 for each of the scanned orders. Computing device is further configured to scan, using the identification device, the machine-readable label on each alimentary element, retrieve information, from a alimentary element database, corresponding to which order each alimentary element corresponds to and the associated destination for each order, and determine if all alimentary elements of an order are accounted for; this may be implemented, without limitation, as described above in reference to FIGS. 1-4.

At step 525, computing device 104 may determine, as a function of the active queue 120, a first order and a second order that are to be transferred together, wherein determining further comprises calculating, using a linear optimization function 128 of the destination locations corresponding to the orders that have been scanned into the active queue 120, an optimal transfer path 120 for each combination of orders in the active queue 120. Computing device 104 may select a transfer path 124 for the a first order and the at least a second order, wherein the transfer path 124 is an optimal transfer path 124 for at least a combination of orders in the active queue 120. Determining a first order and a second order that are to be transferred together may include retrieving, from an alimentary element database, a transfer path relating to the orders in an active queue and determining optimal transfer path. Calculating, using a linear function of the destination locations corresponding to the orders that have been scanned into the active queue 120 may include determining an output of a path that links all destination locations for the orders while minimizing the average time required for traversing the path for all combinations of orders in the active queue. Using a linear function of the destination locations to determine the transfer path may include minimizing the average time of physical transfer of the orders in an active queue below a maximal threshold. The transfer path 128 may be updated as a function of an available physical transfer apparatus containing a location, wherein updating the path may include branching the transfer path 124 as a function of the available physical transfer apparatuses. Updating the transfer path 124 may include calculating the time of traversing a transfer path 124 from an available physical transfer apparatus current location to the current order location; this may be implemented, without limitation, as described above in reference to FIGS. 1-4.

At step 530, computing device may transmit, to a user device, grouping instructions as a function of the optimal transfer path 124. Transmitting to the user device grouping instructions 132 may include displaying on the user device grouping instructions 132, wherein grouping instructions 132 describe which orders should be grouped for physical transfer; this may be implemented, without limitation, as described above in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a terminal.

Figure 6:
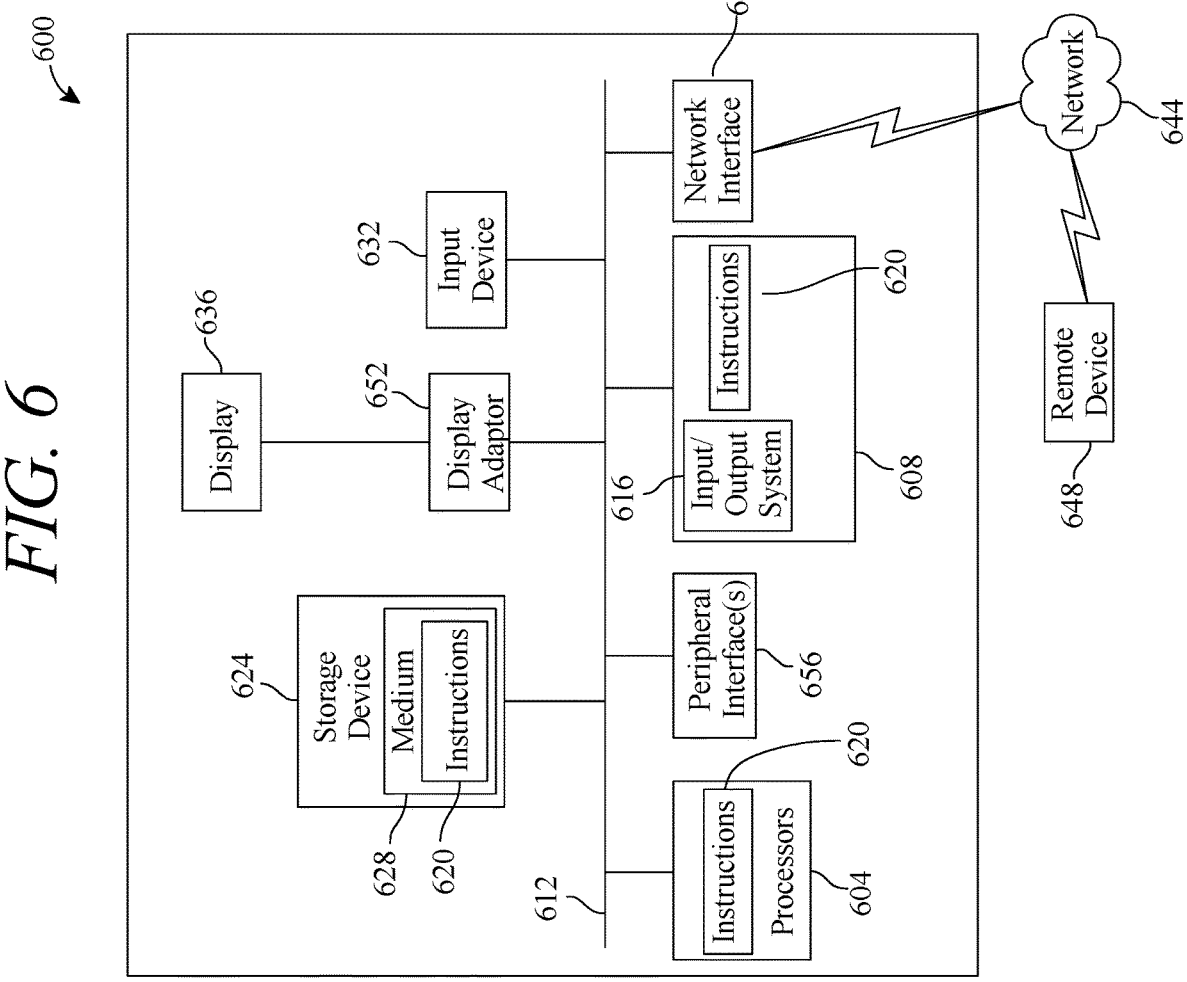
FIG. 6 is a block diagram of a computing system that can be used to implement any one or more of the methods disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for identifying and grouping alimentary elements for physical transfer, the system comprising:
   a computing device configured to:

scan a first machine-readable label and a second machine-readable label, wherein the first machine-readable label identifies a first order, and the second machine-readable label identifies a second order;

extract, from the scan of the first machine-readable label, a first plurality of alimentary elements associated with the first order, an identifier for each alimentary element in the plurality of alimentary elements associated with the first order, and a first destination;

extract, from the scan of the second machine-readable label, a second plurality of alimentary elements associated with the second order, an identifier for each alimentary element in the plurality of alimentary elements associated with the second order, and a second destination;

generate a projected nutritionally guided order volume, wherein generating the projected nutritionally guided order volume comprises;

training a machine learning model as a function of a training data, wherein the training data contains a plurality of data entries containing a past nutritionally guided order volumes correlated to a the projected nutritionally guided order volume as an output, wherein training data comprises examples of past nutritionally guided order volumes;

and generating the projected nutritionally guided order volume using the machine learning model;

calculate an assembly time of the first order and the second order as a function of the projected nutritionally guided order volume;

construct a linear data structure of a first sequential collection of alimentary elements and a second sequential collection of alimentary elements in response to scanning the first and second machine-readable labels;

determine, as a function of the linear data structure whether the first order and the second order are transferred together, wherein determining further comprises:

calculating a score for a pair comprising the first order and the second order as a function of a linear optimization function, the first destination, the second destination, the first plurality of alimentary elements, the assembly time, and the second plurality of alimentary elements;

and assigning a-same transfer path to the first and second orders as a function of the score;

and transmit a grouping instruction for the first and second orders as a function of the same transfer path, wherein the grouping instruction is displayable on a graphical user interface.

2. The system of claim 1, wherein the computing device is further configured to determine, in response to scanning the first machine-readable label, if the first plurality of alimentary elements is complete, wherein determining if the first plurality of alimentary elements is complete comprises:

retrieving, from an alimentary element database, a list of alimentary elements associated with the first order;

and comparing the list of alimentary elements to the first plurality of alimentary elements.

3. The system of claim 1, wherein assigning the same transfer path further comprises assigning the same transfer path further as a function of an average time required for traversing the same transfer path.

4. The system of claim 1, wherein determining whether the first order and the second order are to be transferred together comprises:

minimizing an average time of the same transfer path below a maximal threshold.

5. The system of claim 4, wherein the same transfer path is updated as a function of an available physical transfer apparatus containing a location, and wherein updating the path comprises branching the same transfer path as a function of the available physical transfer apparatuses.

6. The system of claim 5, wherein updating the transfer path further comprises calculating a time of traversing the same transfer path from an available physical transfer apparatus current location to a current order location.

7. A method for identifying and grouping alimentary elements for physical transfer, the method comprising:

scanning, by a computing device, a first machine readable label and a second machine-readable label, wherein the first machine-readable label identifies a first order, and the second machine-readable label identifies a second order;

determining, by the computing device and from the scan of the first machine-readable label, a first plurality of alimentary elements associated with the first order, an identifier for each alimentary element in the plurality of alimentary elements associated with the first order, and a first destination and a first destination;

determining, by the computing device and from the scan of the second machine-readable-label, a second plurality of alimentary elements associated with the second order, an identifier for each alimentary element in the plurality of alimentary elements associated with the second order, and a second destination;

generating, by the computing device a projected nutritionally guided order volume, wherein generating the projected nutritionally guided order volume comprises;

training the machine learning model as a function of a training data, wherein the training data contains a plurality of data entries containing a past nutritionally guided order volumes correlated to a the projected nutritionally guided order volume as an output, wherein training data comprises examples of past nutritionally guided order volumes;

and generating the projected nutritionally guided order volume using the machine learning model;

calculating an assembly time of the first order and the second order as a function of a projected nutritionally guided order volume;

constructing, by the computing device and in response to scans of the first and second machine-readable labels, a linear data structure of a first sequential collection of alimentary elements and a second sequential collection of alimentary elements in response to scanning the first and second machine-readable labels;

determining, by the computing device, as a function of the linear data structure, whether the first order and the second order are to be transferred together, wherein determining further comprises:

calculating a score for a pair comprising the first order and the second order as a function of a linear optimization function, the first destination, the second destination, the first plurality of alimentary elements, the assembly time, and the second plurality of alimentary elements;

and assigning a same transfer path to the first and second orders as a function of the score;

and transmitting, by the computing device, a grouping instruction for the first and second orders as a function of the same transfer path, wherein the grouping instruction is displayable on a graphical user interface.

8. The method of claim 7, further comprising:
determining, by the computing device and in response to scanning the first machine-readable label, if the first plurality of alimentary elements is complete, wherein determining if the first plurality of alimentary elements is complete comprises:
retrieving, from an alimentary element database, a list of alimentary elements associated with the first order;
and comparing the list of alimentary elements to the first plurality of alimentary elements.

9. The method of claim 7, wherein assigning the same transfer path further comprises assigning the same transfer path further as a function of an average time required for traversing the same transfer path.

10. The method of claim 7, wherein determining whether the first order and the second order are to be transferred together comprises:
minimizing an average time of the same transfer path below a maximal threshold.

11. The method of claim 10, wherein the same transfer path is updated as a function of an available physical transfer apparatus containing a location, and wherein updating the path comprises branching the same transfer path as a function of the available physical transfer apparatuses.

12. The method of claim 11, wherein updating transfer path further comprises calculating a time of traversing the same transfer path from an available physical transfer apparatus current location to a current order location.

* * * * *